Dec. 15, 1970     E. L. RAKOWSKY     3,546,938
FLUID FLOW METER
Filed Aug. 28, 1968
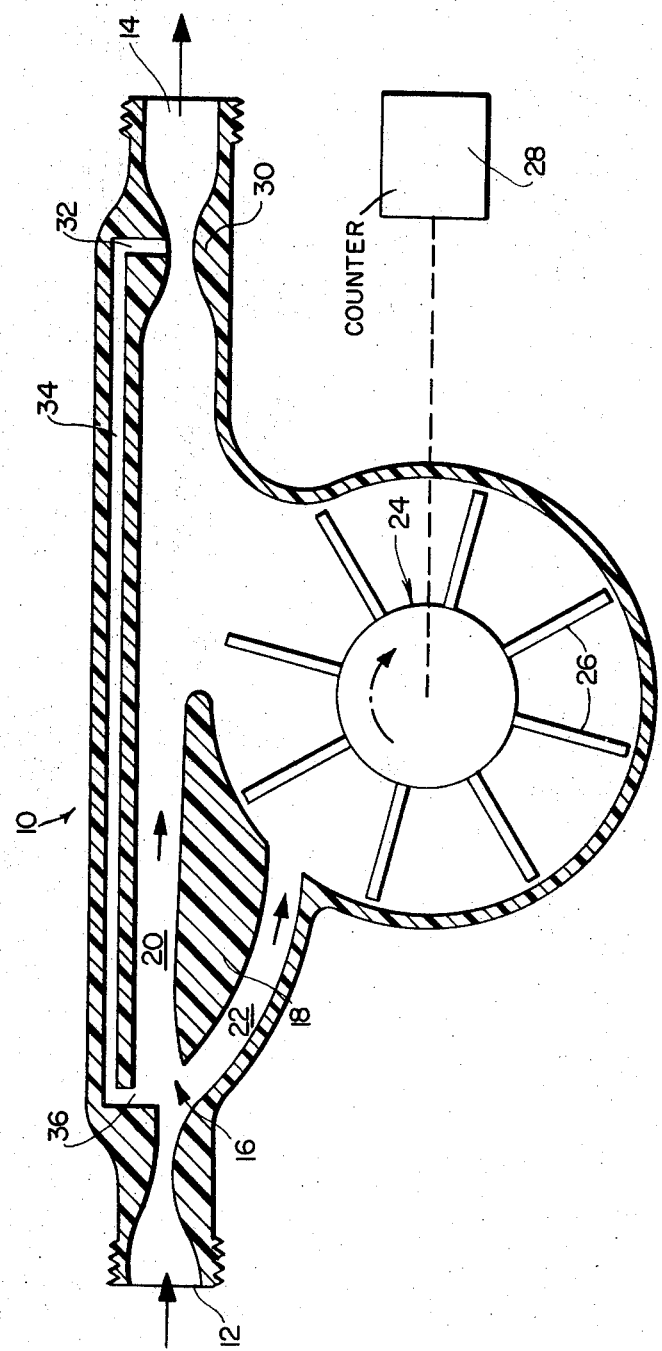
INVENTOR
EDWARD L. RAKOWSKY
BY *S. A. Giavratana*
ATTORNEY United States Patent Office 3,546,938
Patented Dec. 15, 1970

3,546,938
FLUID FLOW METER
Edward L. Rakowsky, Kinnelon, N.J., assignor to Singer-General Precision, Inc., Little Falls, N.J., a corporation of Delaware
Filed Aug. 28, 1968, Ser. No. 755,999
Int. Cl. G01f 1/00, 1/06
U.S. Cl. 73—203                                                4 Claims

ABSTRACT OF THE DISCLOSURE

A fluid flow meter in which a fluid flows through a housing and is divided into a pair of paths in the housing. A paddle wheel is provided in one of the paths and rotates in response to fluid flow therethrough for providing an output signal proportional to the total flow through the housing.

BACKGROUND OF THE INVENTION

This invention relates to a fluid meter, and more particularly to such a meter utilizing a paddle wheel for providing an indication of fluid flow.

It has generally been recognized to provide paddle wheel type fluid meters which incorporate either a single inlet nozzle or multiple nozzles around the periphery of the paddle wheel. However, the low flow rate accuracy of these devices is not acceptable for general use. Therefore, it has been proposed to change the nozzle design of those known meters to obtain a higher velocity at low flow rates in order to improve the accuracy at these flow conditions. However, this proposal results in a high pressure loss and poor accuracy at the high flow conditions.

SUMMARY OF THE INVENTION

It is therefore an object of the present invention to provide a fluid meter utilizing a paddle wheel which enjoys a relatively low pressure loss through the system, and is relatively high in accuracy in both high and low flow conditions.

Briefly summarized, the fluid meter of the present invention comprises a housing having a fluid inlet and outlet extending therethrough with means disposed in the housing to divide the flow through the housing into two paths. Means are also provided which are responsive to the flow through one of the paths for providing an output signal proportional to the total flow through the housing. Also, means can be provided which is responsive to the fluid pressure downstream of the paths to divert a corresponding amount of the portion of fluid flow from said one path to the other path to reduce the pressure losses across the housing.

BRIEF DESCRIPTION OF THE DRAWINGS

Reference is now made to the accompanying drawing for a better understanding of the nature and objects of the fluid meter of the present invention, which drawing illustrates the best mode presently contemplated for carrying out the objects of the invention and its principles, and is not to be construed as restrictions or limitations on its scope. The drawing is a transverse sectional view showing the device of the present invention.

DESCRIPTION OF THE PREFERRED EMBODIMENTS

Referring specifically to the drawing, which shows the fluid meter of the present invention, the reference numeral 10 refers to a housing which may be of a molded plastic and which has an inlet 12 which may be in the form of a nozzle, and an outlet 14, both inlet and outlet being threaded as shown to provide for connections with external plumbing. A fluidic proportional valve, shown generally by the reference numeral 16, is disposed in the housing adjacent the inlet 12 and includes a dividing member 18 which divides the housing into a pair of flow paths 20 and 22. A paddle wheel 24 is disposed in the housing and has a plurality of vanes 26 which are impinged by the fluid flowing through the path 22 to rotate the wheel in the direction indicated by the arrow. A means, such as a counter 28, may be operatively connected to the paddle wheel 24 for providing an indication of the revolutions of the latter.

A venturi 30 is provided in the outlet 14, and a pressure tap 32 is formed through the venturi and is connected by means of a signal line 34 to a control signal port 36 which terminates at the proportional valve 16.

In operation of the meter of the present invention, fluid enters the housing 10 through the inlet 12 and flows in a direction shown by the arrows after being separated into the two paths 20 and 22 by means of the dividing member 18. Flow through the path 22 causes the paddle to rotate and then combines with the flow through the path 20 and passes through the venturi 30 and out the outlet 14.

It is apparent that as the flow rate increases the static pressure at the venturi will decrease by a proportional amount. This latter pressure is sensed by the pressure tap 32 and is transmitted through the signal line 34 to the control signal port 36 which, in turn, controls the fluid flow through the proportional valve 16. At low flow rates, a small signal differential pressure between the control signal port 36 and the inlet 12 is produced and most of the fluid passes through the path 22 and rotates the paddle wheel 24. As the flow rate increases, a proportional decrease in the static pressure at the pressure tap 32 occurs which is transmitted via the signal line 34, to the control signal port 36. This causes a larger differential pressure to occur between the control signal port 36 and the inlet 12 which produces a sucking effect that proportionally switches the fluid flow from hte path 22 to the path 20. The paddle wheel counter arrangement can be calibrated with the above parameters taken into consideration so that the flow through the path 22 will give an indication of the total flow through the system.

It is apparent from the above that a relative low pressure drop occurs across the housing since a great deal of the fluid passes directly from the inlet to the outlet without passing through the paddle wheel. Also, it has been ascertained that a relative high degree of accuracy can be obtained, especially at low flow ranges. It is noted that these improvements are accomplished with the use of no moving parts other than the paddle wheel since the above structure can be made part of the molded plastic housing, and that long life and reliability are therefore inherent in the design.

It is understood that several variations of the above can be made without departing from the scope of the present invention. For example, the sensing pressure tap 32 can be located at several other positions, such as on the periphery of the paddle wheel. In addition, a multiple flow injection system may be provided instead of the single path 22.

Of course, other variations of the specific construction and arrangement of the fluid meter disclosed above can be made by those skilled in the art without departing from the invention as defined in the appended claims.

What is claimed is:

1. A fluid flow meter comprising a housing having at least one fluid inlet and a fluid outlet, dividing means having an upstream end and a downstream end disposed in said housing to direct predetermined portions of fluid from said inlet into first and second paths, means responsive to the flow of fluid through said first path for providing an output signal proportional to the total flow through said housing, control signal port means disposed within said housing adjacent the upstream end of said dividing means for controlling the proportionate amount of fluid flow in each of said paths, and means coupled to said control port menas and responsive to the fluid pressure downstream of said paths for causing said control port means to divert a corresponding amount of said predetermined portion of fluid flow from said first path to said second path, to thereby stabilize the pressure loss across said housing with increasing rates of fluid flow.

2. The meter of claim 1 wherein said means responsive to the fluid pressure downstream of said paths comprises a restricted portion of the housing adjacent said outlet and a signal line extending between said restricted portion and said control signal port means, said signal line being adapted to transmit the static pressure in said restricted portion to said control port means.

3. The meter of claim 1 wherein said means responsive ot the flow of fluid through said first path comprises a paddle wheel disposed in said first path and adapted to rotate in response to fluid flow therethrough, and calibrated counter means operatively connected to said paddle wheel and responsive to predetermined revolutions of said paddle wheel for giving an indication of the flow through said housing.

4. The meter of claim 3, wherein said control signal port means comprises a signal port adjacent the upstream end of said dividing means to form a fluidic proportional valve therewith, and wherein said restricted portion of the housing comprises a venturi restriction adapted to receive the total fluid flow through said housing.

References Cited

UNITED STATES PATENTS

| | | | |
|---|---|---|---|
| 3,170,476 | 2/1965 | Reilly | 137—81.5 |
| 3,183,712 | 5/1965 | Stevenson | 73—203 |

JAMES J. GILL, Primary Examiner

M. SMOLLAR, Assistant Examiner

U.S. Cl. X.R.

73—213, 229